(12) United States Patent
Smith

(10) Patent No.: US 11,530,083 B2
(45) Date of Patent: Dec. 20, 2022

(54) RACKING PROTECTION DEVICE

(71) Applicant: A-FAX LIMITED, Halifax (GB)

(72) Inventor: Luke Smith, Halifax (GB)

(73) Assignee: A-FAX LIMITED, Halifax (GB)

( * ) Notice: Subject to any disclaimer, the term of this patent is extended or adjusted under 35 U.S.C. 154(b) by 1065 days.

(21) Appl. No.: 16/303,731

(22) PCT Filed: May 23, 2017

(86) PCT No.: PCT/GB2017/051442
§ 371 (c)(1),
(2) Date: Nov. 21, 2018

(87) PCT Pub. No.: WO2017/203235
PCT Pub. Date: Nov. 30, 2017

(65) Prior Publication Data
US 2020/0346835 A1    Nov. 5, 2020

(30) Foreign Application Priority Data
May 23, 2016  (GB) ..................................... 1609043

(51) Int. Cl.
*B65D 79/02* (2006.01)
*G01C 9/06* (2006.01)
*G01P 15/08* (2006.01)

(52) U.S. Cl.
CPC ............... *B65D 79/02* (2013.01); *G01C 9/06* (2013.01); *G01P 15/0891* (2013.01); *B65D 2203/10* (2013.01); *B65D 2590/0083* (2013.01)

(58) Field of Classification Search
None
See application file for complete search history.

(56) References Cited

U.S. PATENT DOCUMENTS 5,929,767 A    7/1999  Wallick
9,261,528 B2   2/2016  Imamura et al.
(Continued)

FOREIGN PATENT DOCUMENTS

CN    204595548 U    8/2015
GB      2550586 A   11/2017
(Continued)

OTHER PUBLICATIONS

Europeant Patent Office, Patent Cooperation Treaty International Search Report in related application PCT/GB2017/051442, dated Nov. 14, 2017, pp. 1-4.
(Continued)

*Primary Examiner* — Adolf Dsouza
(74) *Attorney, Agent, or Firm* — Shumaker, Loop & Kendrick, LLP

(57) ABSTRACT

A racking protection device that includes a housing and vibration monitor. The vibration monitor is arranged to record the vibration transmitting through a racking component. The housing includes an alert for alerting a user when the racking requires inspection for damage to impacts. The vibration monitor records the frequency and time of each impact. The vibration monitor includes a memory that counts and records the number of minor impacts. The vibration monitor determines a minor impact when the peak frequency is between a minimum and maximum pre-set level for a predetermined time period. When a predeteiiii-ined number of minor impacts is exceeded, the alert is arranged to alert the user to inspect the racking for damage. When the frequency exceeds the maximum pre-set level for a predetermined time period the vibration monitor determines that a severe impact has occurred and the alert is arranged to alert the user to inspect the racking for damage.

13 Claims, 3 Drawing Sheets

(56) References Cited

U.S. PATENT DOCUMENTS

| | | | |
|---|---|---|---|
| 9,657,426 | B2 | 5/2017 | Chung et al. |
| 2003/0090645 | A1* | 5/2003 | Kato .................. G03F 7/70975 |
| | | | 355/75 |
| 2006/0077764 | A1* | 4/2006 | Liu ....................... G04R 60/14 |
| | | | 368/47 |
| 2008/0073431 | A1 | 3/2008 | Davis |
| 2014/0005960 | A1 | 1/2014 | Anderson |
| 2014/0083142 | A1* | 3/2014 | Chung .................. D06F 33/48 |
| | | | 700/280 |
| 2014/0361883 | A1 | 12/2014 | Ryan et al. |
| 2015/0209293 | A1 | 10/2015 | Chernega |
| 2015/0292937 | A1 | 10/2015 | Chernega et al. |

FOREIGN PATENT DOCUMENTS

| | | | |
|---|---|---|---|
| JP | 2005014828 | A | 1/2005 |
| KR | 20130045877 | A | 5/2013 |
| KR | 101611925 | B1 | 4/2016 |
| WO | 2017203235 | A1 | 11/2017 |

OTHER PUBLICATIONS

Patent Examination Report for GB1608043.3, dated Dec. 11, 2019.
Caption Data Ltd., "Building Vibration Monitoring System," Mar. 23, 2016, https://web.archive.org/web/20160323142114/http://www.captiondata.com:80/building-vibration-monitoring-system/.
ServersCheck, "Digital Shock / Vibration Sensor Probe," Apr. 12, 2016, https://web.archive.org/web/20160413165038/https://serverscheck.com/sensors/sensor_vibration.asp.
Chen Mingwen, Li Shiguang, Zhao Jilei; Study on the Application of the Automatic Recognition Method in Monitoring Dynamic Deformations of Steel Storage Racks; Science & Technology Information—Frontier for Science & Education; Issue 35, 2011.

* cited by examiner

RACKING PROTECTION DEVICE

TECHNICAL FIELD AND BACKGROUND OF THE INVENTION

The present invention relates to a racking protection device that can be installed to racking, for instance but not exclusively, within a warehouse as part of a safety scheme Racking providing shelving for storage of pallets and other products within a warehouse environment is well known. Generally formed from a frame including steel uprights, it is not uncommon for the racking to be several meters tall, with multiple shelves. Forklift trucks and other loading systems and vehicles are used to load and unload the pallets from the shelving. In busy warehouses, the shelves may be loaded and unloaded up to one hundred times a day.

The steel uprights form racking legs are prone to damage from collision with the forklift trucks and unloading systems. Severe impacts can seriously weaken the structural integrity of the racking. As can multiple lower intensity impacts. Warehouses therefore carry out regular inspections of the racking to inspect for damage. With damaged racking being detected and repaired or replaced before the structural integrity becomes a danger.

However, even with regular inspections, damage from severe impacts can not always be detected visually nor can the impact of multiple low intensity impacts be assessed from a visual inspection. Moreover, the legs of the racking are often guarded by protectors, which may cover the damage. By purpose, the guards are not easily removed, making visual inspection yet more complicated.

Visual inspections can be aided by collision reporting. This relies on the forklift operators reporting the location and type of collision. However, underreporting is not unknown, nor is reporting incorrect locations in order to avoid any perceived repercussions on the operator of a collision.

SUMMARY OF THE INVENTION

There is therefore a need to provide an aid to assist the reporting and monitoring of impacts to the racking in order to overcome at least one of the above or other disadvantages. It is a further aim to provide a racking protection device to record the location of impacts to the racking. It is a further aim to provide a racking protection device that records the location of impacts without the need for operator input.

According to the present invention there is provided an apparatus and method as set forth in the appended claims. Other features of the invention will be apparent from the dependent claims, and the description which follows.

A racking protection device comprises a housing and vibration monitor. The vibration monitor is arranged to record the vibration transmitting through a racking component. The housing includes an alert for alerting a user when the racking requires inspection for damage to impacts. The vibration monitor records the frequency and time of each impact. The vibration monitor includes a memory that counts and records the number of minor impacts. The vibration monitor determines a minor impact when the peak frequency is between a minimum and maximum pre-set level for a predetermined time period. When a predetermined number of minor impacts is exceeded, the alert is arranged to alert the user to inspect the racking for damage. When the frequency exceeds the maximum pre-set level for a predetermined time period the vibration monitor determines that a severe impact has occurred and the alert is arranged to alert the user to inspect the racking for damage.

The vibration monitor is arranged to ignore an initial period after the frequency exceeds the minimum pre-set level. By ignoring the initial period of the impact vibration, it has been found that false alerts can be reduced. For instance, false alerts can be generated by the vibration generated by loading of the shelves. During loading, the impact is in a vertical direction, whereas impacts from vehicles that can cause structural damage act in a horizontal direction. Also, the vibration from loading and unloading shelving can be dependent on the loading level and shelf height of the racking. By ignoring the initial vibration, the vibration monitor can more easily differentiate between potential structural damage and vibrations caused by usual loading.

It is important to minimise false alerts as unnecessary alerts reduce the effectiveness of the racking protection device as alerts are more likely to be ignored.

The memory may be able to communicate with a central control computer so that the vibration history is able to be analysed for use in generating an inspection regime. Furthermore, the racking protection device may include sensing means to cooperate with transmitters or sensors in the forklift trucks or loading devices so that the location of nearby devices can also be recorded at the time of impact for future identification. In some embodiments, the location of nearby vehicles can be crossed referenced to the recorded vibrations as further criteria to the determination of minor and severe impacts.

The alert may be a visual alert, or an audible alert, or an alert signal transmitted to a secondary device. In the exemplary embodiments, the alert is a visual alert. Here, the alert comprises an optical transmitter housed in the housing. The optical transmitter may have a series of different alert signals in order to differentiate between different alerts. As well as the minor impact alert and severe impact alert, the alert may also produce an alert when the device is low on power or when the device has been tampered with, for instance the device has been removed from the racking position. The optical transmitter may differentiate between alerts by transmitting different pulse patterns, or by transmitting different colours, or a combination of the two. In the exemplary embodiments, the optical transmitter comprises an array of light transmitters. Additionally or alternatively, the location of the specific light transmitter activated within the array may be used to differentiate between signals.

The device may comprises an attachment means to attach the device to the racking. In the exemplary embodiments, the attachment device comprises a magnet. Preferably the magnet provides a strong attraction to the racking so that the device is inclined to be tilted and peeled off the racking. Here, the device includes a tilt sensor. The tilt sensor is arranged to cause the alert to transmit a tamper signal when the tilt sensor detects the device has been tilted. Consequently, should a user attempt to move a device, the device is arranged to transmit an alert.

The device includes a reset means. Suitably the reset means is restricted to access only by authorised personnel. In the exemplary embodiments the device includes a photo-detector. The photo-detector generates an electrical signal in response to incident light. Here, the photo-detector is arranged to generate a reset signal in response to a predetermined light input signal. The predetermined input light signal is preferably a unique pulse sequence. With each pulse having an intensity and pulse period. Suitably, the photo-detector is arranged to detect light frequency generated by the flash or light function from a portable device such as a mobile telephone. In this way, authorised personnel may be provided with the reset signal and the device can be reset whilst installed on the racking by holding the portable device near to the device and activating the portable device to emit the reset signal.

BRIEF DESCRIPTION OF THE DRAWING FIGURES

For a better understanding of the invention, and to show how embodiments of the same may be carried into effect, reference will now be made, by way of example, to the accompanying diagrammatic drawings in which.

DETAILED DESCRIPTION OF THE PREFERRED EMBODIMENT

Figure 1:
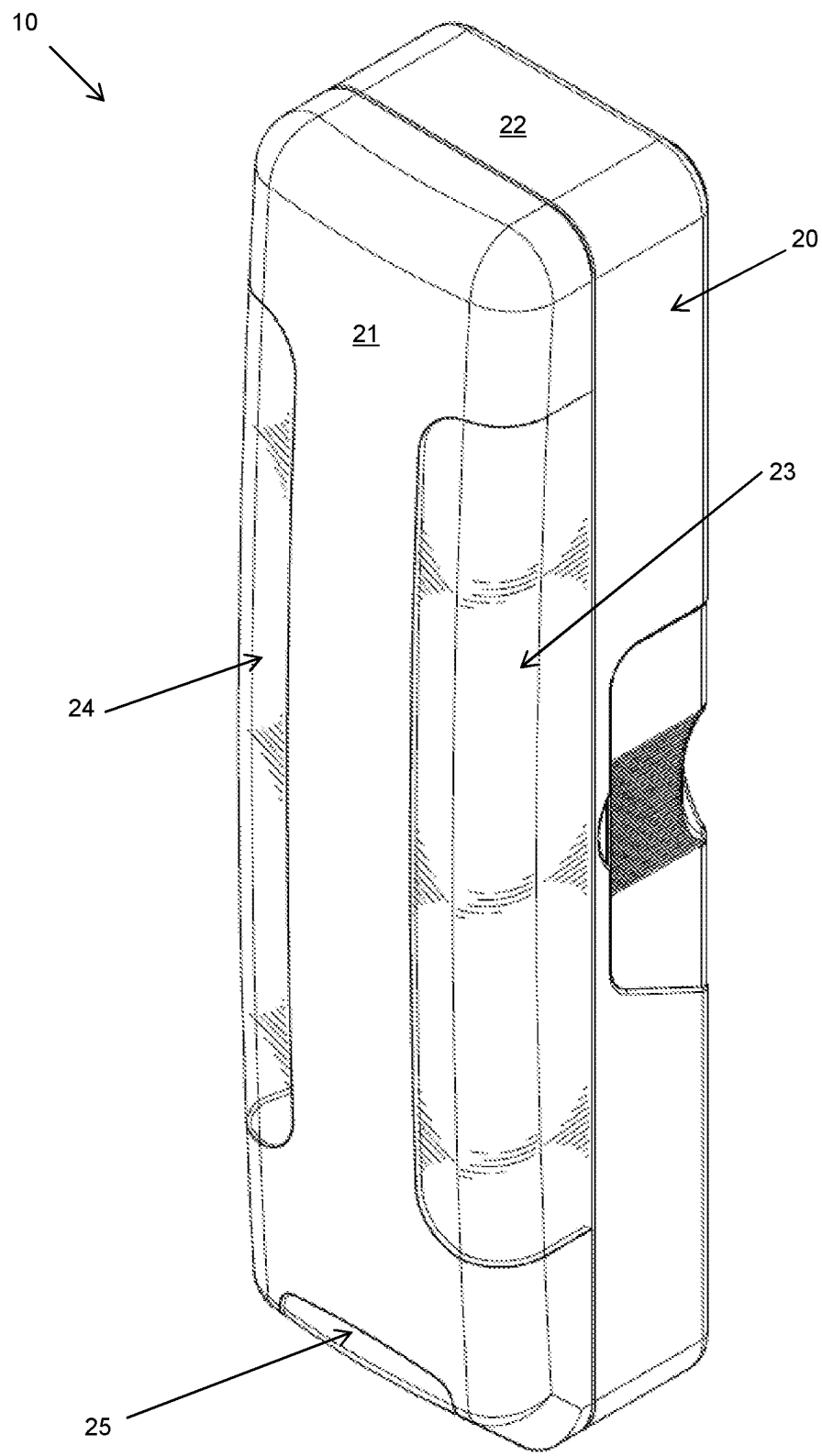
FIG. 1 is a perspective view of a racking protection device.
Figure 2:
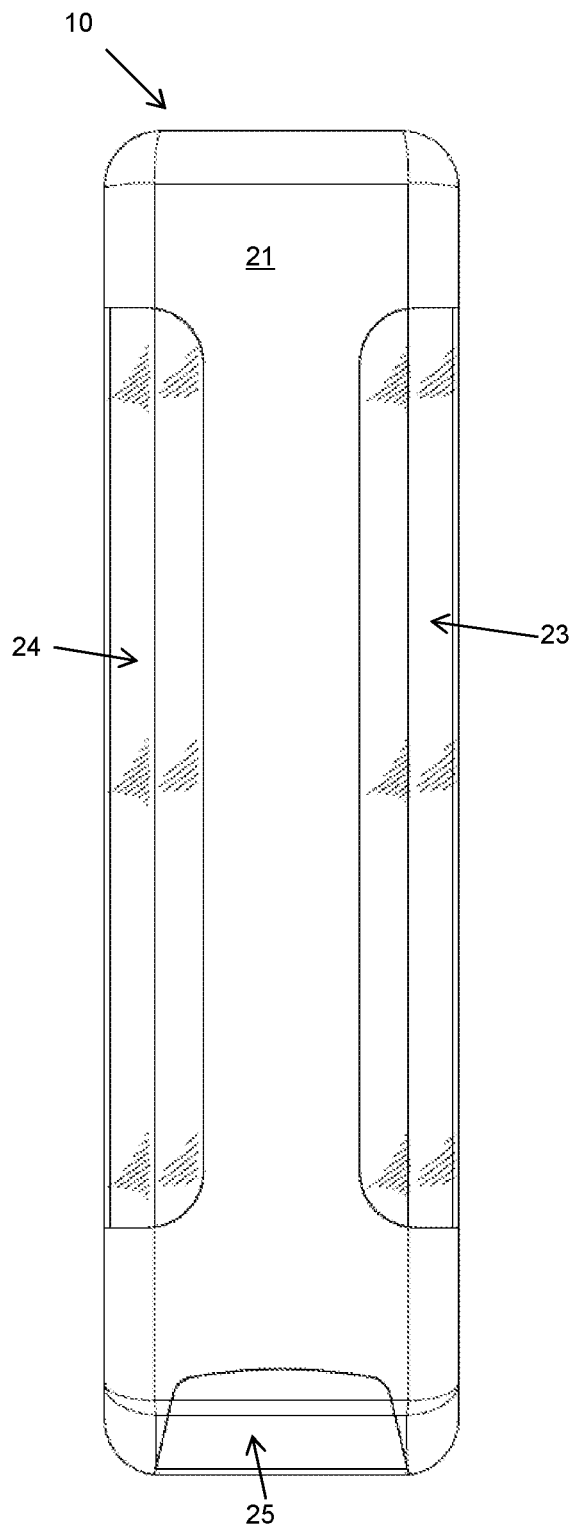
FIG. 2 shows front and side views of FIG. 1.
Figure 2:
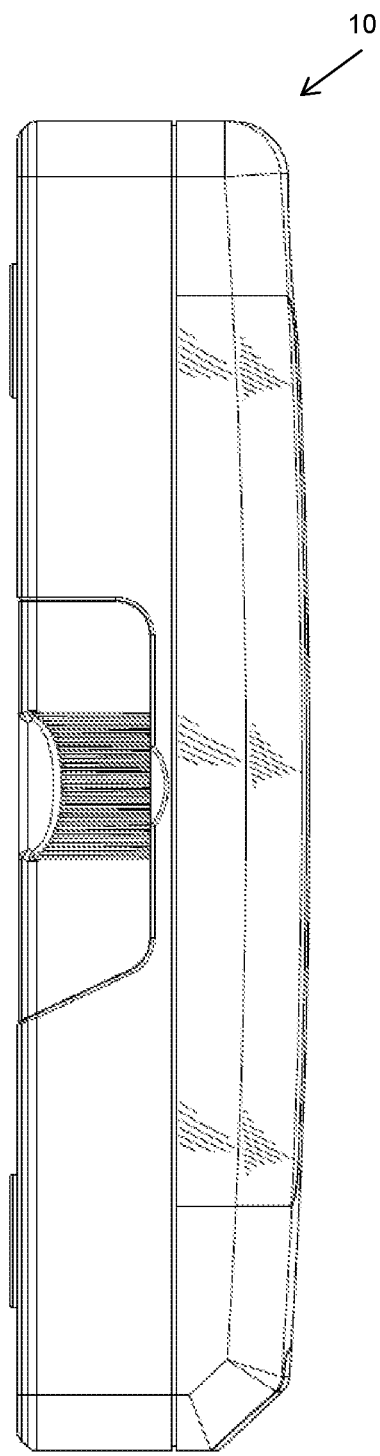
Figure 3:
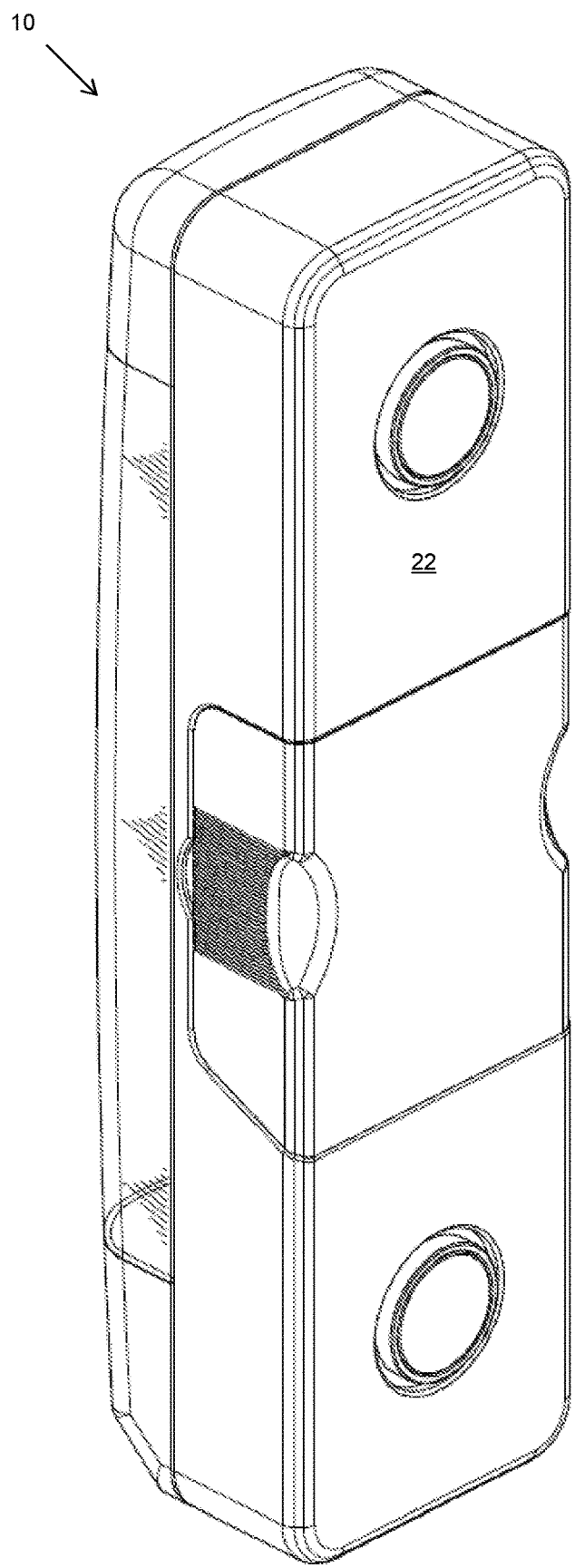
FIG. 3 shows a rear perspective view of FIG. 1.

Referring to the Figures there is provided a racking protection device 10. The racking protection device comprises a housing 20. The housing has a front part 21 connectable to a rear part 22 so that the housing can be separated to allow various components to be installed therein. The housing is generally elongate. The elongate shape provides the device with an orientation. Here, the housing may include an indication as to a top or bottom of the housing. In this way, the housing provides a visual indication as to the orientation of the device on the racking allowing the racking to be installed in a generally aligned position on the racking leg. For instance, the elongate shape is arranged to extend along an axis of the racking leg to which the device is intended to be attached.

The front housing 21 includes window portions 23, 24, 25. The window portions are optically transparent to at least some specific wavelengths so that light can be transmitted through the window portions. It will be appreciated that the window portions correspond to areas within the housing to which optical transmitters or receivers are installed.

The rear housing portion includes locations for installing magnets for attaching the device to the racking. The attachment locations may comprise recesses for mechanically keying the magnets to the housing as is known in the art. The housing is shown as having a plurality of magnets. Here the magnets are spaced apart in order to encourage an operator to create a peeling motion on the device when the device is detached from the racking. Here the peeling motion causes the device to tilt, which, as will be herein described, can be used to generate a tamper signal.

A vibration monitor is installed within the housing 20. The vibration monitor includes a vibration sensor. The vibration sensor is suitably affixed to the rear housing and arranged to record vibrations transmitted from the racking the rear housing. Vibration sensors are known in the art, and in the exemplary embodiments a single axis accelerometer was used. The single axis accelerometer is aligned in a specific direction along the rear housing, and preferably aligned to the longitudinal direction of the housing. The vibration monitor includes a memory and controller connected together by a PCB. The memory records the frequency and vibration of each detected impact. An impact is detected based on a peak reading being above a minimum frequency threshold. The vibration monitor differentiates between minor impacts and severe impacts. Minor impacts are significant but relatively low force such that each individual impact might be insufficient to generate damage but multiple impacts may create damage. Severe impacts are impacts with sufficient force such that damage might have occurred from the single impact. The vibration monitor causes an alert to be issued when a severe impact is detected or when a predetermined number of minor impacts are exceeded over a period of time.

In the exemplary embodiments, the impact monitor differentiates between minor and severe impacts based on the vibration frequency exceeding pre-determined frequencies over a pre-determined time. A minor impact is determined if the frequency of the vibration is between a minimum frequency and a maximum frequency for a predetermined time period. A severe impact is determined if the vibration frequency exceeds the maximum predetermined frequency for a predetermined time period. When determining a minor or severe impact, the initial vibration is ignored. That is, the time period during which the recorded frequency exceeds the predetermined thresholds is initiated after the initial vibration peak. This allows the vibration monitor to ignore typically vibration patterns generated by usual loading of the racking.

In the exemplary embodiments the device includes an optical transmitter. The optical transmitter is configured to issue an optical alert based on the determination of the vibration monitor. Suitably, the optical transmitter comprises an array of optical transmitters. As shown in the figures multiple arrays may be provided on either side of the housing. Each array of transmitters may comprise a plurality of spaced transmitters. One or more of the individual transmitters of each array may comprise a different colour transmitter. The optical transmitter comprising a driving means to drive the or each transmitter to emit a signal according to an output of the vibration monitor. In addition, the optical transmitter may be arranged to issue an alternative signal to indicate a tamper status or that the device is low on power. Here, for instance, the device includes a battery means housed within the housing and the optical transmitter issues an alert when the power is low. Additionally, the optical transmitter may emit an alert to indicate the device is in normal operating parameters.

The device may comprise a tilt monitor. The tilt monitor being known in the art and configured to detect when the device is tilted past a predetermined degree. The tilt monitor being arranged to cause an alert to be issued should the device be tilted past the predetermined degree. Consequently, the device is able to alert users should the device have been tilted, for instance in order to remove the device from the racking.

After an alert has been issued and dealt with, the device can be reset. Here, the device includes a reset means. Suitably the reset means is restricted so that only authorised personnel can reset the device. Moreover, the device should ideally be able to be reset whilst in position on the racking so that the tamper alert is not triggered during the attachment procedure. In the exemplary embodiments, the reset means comprises a photo-detector installed within the housing. The photo-detector is shown in the figures as being installed behind a window in an upper region of the housing. The photo-detector is arranged to detect a specific light pattern and to generate a reset signal once the specific light signal is detected. For instance, a specific light signal may be a predetermined series of light pulses. The photo-detector being arranged to detect a light frequency able to be generated, according to the exemplary embodiment, by the light provided by a mobile device such as a mobile telephone.

Although a few preferred embodiments have been shown and described, it will be appreciated by those skilled in the art that various changes and modifications might be made without departing from the scope of the invention, as defined in the appended claims. Specifically, the protection device may be configured to alert users to impacts other than racking.

The invention claimed is:

1. A racking protection device configured for affixing to a racking component exterior, the racking protection device comprising:
    a housing having a vibration monitor and an alert housed therein,
    the vibration monitor arranged to record the vibration transmitting through the housing from the racking component;
    the alert is operably connected within the housing to the vibration monitor and is configured for alerting a user when the racking component requires inspection for damage to impacts;
    the vibration monitor determines a minor impact when a peak frequency of the vibration is between a minimum and maximum pre-set level for a minor impact predetermined time period and when a predetermined number of minor impacts is exceeded, the alert is arranged to alert the user to inspect the racking component for damage; and
    when a frequency of the vibration exceeds the maximum pre-set level for a severe impact predetermined time period the vibration monitor determines that a severe impact has occurred and the alert is arranged to alert the user to inspect the racking component for damage.

2. The racking protection device of claim 1, wherein the vibration monitor is arranged to ignore an initial period after the frequency exceeds the minimum pre-set level.

3. The racking protection device of claim 1 including a memory for storing and transmitting the vibration records for analysis.

4. The racking protection device of claim 1 wherein the alert comprises an optical transmitter housed in the housing.

5. The racking protection device of claim 4, wherein the optical transmitter includes a series of different alert signals in order to differentiate between different alerts.

6. The racking protection device of claim 4, wherein the housing further comprises window portions that are optically transparent to specific light wavelengths so that specific light wavelengths can be transmitted through the housing into the interior of the racking protection device to the optical transmitter.

7. The racking protection device of claim 5, wherein the housing further comprises window portions that are optically transparent to specific light wavelengths so that specific light wavelengths can be transmitted through the housing into the interior of the racking protection device to the optical transmitter.

8. The racking protection device of claim 1 wherein the device includes an attachment means to attach the device to the racking component and the attachment means comprises at least one magnet.

9. The racking protection device of claim 1 wherein the device includes a tilt sensor arranged to cause the alert to transmit a tamper signal when the tilt sensor detects the device has been tilted.

10. The racking protection device of claim 1 wherein the device includes a reset means within the housing.

11. The racking protection device of claim 10, wherein the reset means comprises a photo-detector arranged to generate an electrical signal in response to incident light.

12. A method of protecting racking, comprising mounting the racking protection device of claim 1 on a racking leg, causing the racking protection device to monitor vibrations in the racking and to issue an alert when a predetermined number of minor impacts are detected or when a severe impact is detected.

13. The method of claim 12, wherein the racking protection device is mounted to the racking by magnetic attraction such the device is required to be tilted in order to be removed from the racking and the device including a tilt sensor arranged to issue a tamper alert when the device is tilted a certain degree.

* * * * *